March 11, 1969  A. P. JENTOFT  3,432,139
EXTENSIBLE PLUG VALVE
Filed Oct. 12, 1961
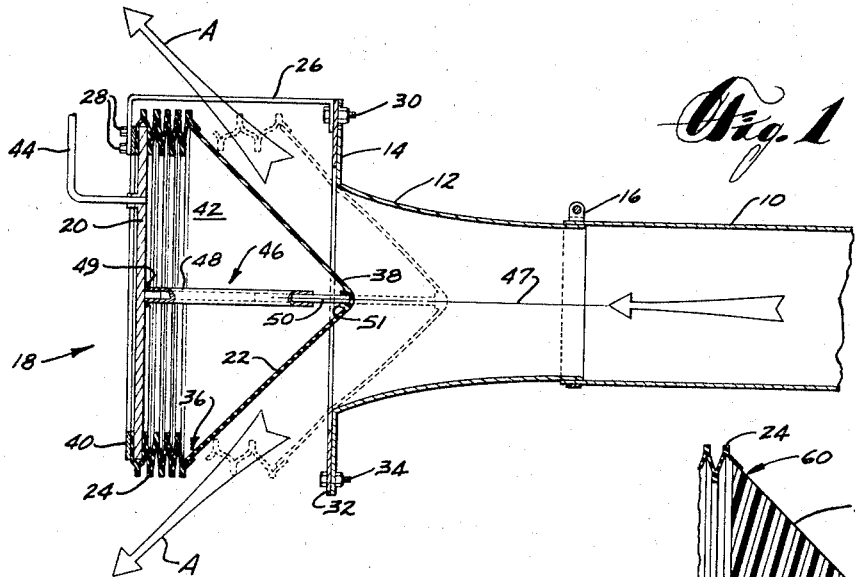
INVENTOR.
ARTHUR P. JENTOFT
BY
George E. Manias
AGENT United States Patent Office 3,432,139
Patented Mar. 11, 1969

3,432,139
EXTENSIBLE PLUG VALVE
Arthur Philip Jentoft, Wexford, Pa., assignor to
H. H. Robertson Company
Filed Oct. 12, 1961, Ser. No. 144,610
The portion of the term of the patent subsequent to
Nov. 27, 1978, has been disclaimed
U.S. Cl. 251—61.1     9 Claims
Int. Cl. F16k *31/145, 31/165, 51/00*

The present invention relates to valve means for controlling the flow of gas from a conduit terminal. More particularly the present invention relates to a valve comprising an extendable plug mounted in axially aligned relation with respect to an outwardly flared terminal portion of a gas flow conduit.

The present invention is particularly useful in the ventilating art.

According to the present invention, I provide a plug which is axially aligned with and normally spaced apart from a flared horn which communicates with a gas passageway or duct. A normally collapsed, resilient bellows connects the plug to a back plate whereby the back plate, the bellows and the plug form a chamber. Conduit means are provided whereby a pressurized fluid may be introduced into or withdrawn from the chamber to cause the plug to move toward or away from the horn and thereby to control the discharge of gas from the gas passageway or duct.

Valves according to the present invention can be conveniently operated from a remote control point. Relatively low gas pressures are required to operate the present valve. The present valve is easily assembled, installed and dismantled. The present valve requires no delicate alignment adjustments which has been one problem associated with the terminal valves of the prior art. The present valve is relatively inexpensive to manufacture and maintain and provides a unitary valve assembly that is interchangeable with other valve assemblies.

The primary object of this invention is to provide a valve for controlling the flow of gases which are discharged from a conduit into an enlarged discharge zone.

A further object of this invention is to provide means for maintaining the plug of the present valve in substantial alignment with the axis of the gas passageway with which the plug cooperates.

The present invention, its objects and advantages will be described by reference to the accompanying drawings in which:

FIGURE 1 is a cross-sectional illustration of a preferred embodiment of the present valve;

FIGURE 2 is a fragmentary cross-sectional view similar to FIGURE 1 illustrating an alternative embodiment of the present valve assembly;

FIGURE 3 is a cross-sectional view taken along the line 3—3 of FIGURE 2 illustrating radial support arms;

FIGURE 4 is a fragmentary cross-sectional view illustrating an alternative embodiment of a plug; and FIGURE 5 is a fragmentary cross-section view, similar to FIGURE 2, illustrating a further alternative embodiment of the present valve assembly.

Referring to FIGURE 1, a gas conduit 10 serves to convey gases such as ventilating air. The discharge of gases from the conduit 10 can be regulated by means of the terminal valve of this invention. A flared horn 12, preferably of circular cross-section, has a radial flange 14 at its enlarged end and is engageable at its narrow end with the conduit 10. A connector strap 16 is provided to secure the horn 12 to the conduit 10. The flared horn 12 preferably is formed by spinning a metal tube such as aluminum or steel.

The extendable portion of the present valve is generally indicated by the numeral 18 and comprises a back plate 20, a plug 22 and a bellows 24.

The back plate 20 is secured in spaced outer relation to the enlarged end of the horn 12 by means of spaced support arms 26 extending from the back plate 20 to the rim or radial flange 14. The support arms 26 are secured, for example, by means of bolts 28, to the back plate 20 and by means of bolts 30 to a circular ring 32 corresponding to the radial flange 14. The circular ring 32 may be secured to the radial flange 14 by means of bolts 34 and serves to stiffen the radial flange 14. Also the circular ring 32 may be disconnected from the radial flange 14 without breaking its connection with the support arms 26. The back plate 20 preferably is formed from a metal stamping or die casting.

The plug 22 includes a base end 36 and an apex end 38 and preferably has a diminishing cross-sectional area from the base end 36 to the apex end 38, as for example, the conical configuration herein illustrated. The plug 22 preferably is a hollow conical plug of relatively rigid material such as stiff rubber, sheet metal or plastic materials. As shown, the plug 22 is positioned between the back plate 20 and the horn 12.

The bellows 24 preferably is a normally collapsed bellows of resilient material such as rubber. The bellows 24 serves to connect the back plate 20 to the plug 22. The bellows 24 is secured at one end to the base end 36 of the plug 22, for example, by means of a suitable adhesive substance. The other end of the bellows 24 is secured to the plate 20 by means of the bolts 28. A compression ring 40 is interposed between the ends of the support arms 26 and the end of the bellows 24 and serves to compress the end of the bellows 24 so that a seal is formed.

The back plate 20, the plug 22 and the bellows 24, as assembled, define a chamber 42 in which a pressurized fluid may be introduced and withdrawn whereby the plug 22 moves toward and away from the horn 12 to control the flow of gas therefrom. A conduit means, such as the conduit 44, communicates with the chamber 42 for admitting and withdrawing pressurized fluids to and from the chamber 42. The conduit 44 is shown extending through the back plate 20. The pressurized fluids which are introduced into the chamber 42 may originate from a remote control point to permit the remote operation of the present valve.

The present valve further includes an extensible alignment means 46 for maintaining the plug 22 substantially aligned with the central axis 47 of the horn 12.

The extensible alignment means 46 preferably is positioned within the chamber 42 and comprises a guide shaft 48 and a guided shaft 50. One end of the guide shaft 48 is secured to the back plate 20, for example, by means of a weld 49, in axially aligned relation with the plug 22. The guided shaft 50 has one end secured in a hub 51 at the apex end of the plug 22 in axially aligned relation with the plug 22. Preferably the guide shaft 48 comprises a tubular member while the guided shaft 50 comprises a rod. As can be seen, in FIGURE 1, the guide shaft 48 and the guided shaft 50 are telescopingly engaged whereby, when pressurized fluid is introduced into the chamber 42, the increasing pressure causes expansion of the bellows 24 and movement of the plug 22 toward the horn 12 in flow controlling relation therewith. If sufficient pressure is maintained within the chamber 42, the plug 22 will engage the horn 12, as illustrated in phantom outline in FIGURE 1, to substantially entirely obstruct the flow of gas out from the conduit 10. When the pressure within the chamber 42 is lowered (by removal of some of the pressurized fluid from the chamber 42), the bellows 24 will tend to collapse and draw the plug 22 away from the horn 12.

An annular gas passageway is thus presented for the discharge of gas from the conduit 10 as indicated by the arrows A. Gases flowing as indicated by the arrows A enter an enlarged discharge zone at a rate which is regulated by the present valve. The enlarged discharge zone might be a room of a building and the conduit 10 might be a ventilation air passageway. Since the effective cross-sectional area of the plug 22 is substantially larger than the cross-sectional area of the conduit 10, a relatively low pressure is required to operate the present valve.

It should be apparent that the guide shaft 48 could be secured to the plug 22 and the guided shaft 50 could be secured to the back plate 20 without interfering with the operation of the extensible alignment means 46.

An alternative embodiment of the present invention is illustrated in FIGURES 2 and 3. Corresponding numerals are employed to identify corresponding elements already described. In this embodiment a plug 22' is formed from a hollow conical thin resilient material such as rubber. The plug 22' has a base end 36' which is secured to one end of the bellows 24 or which is contiguous therewith as specifically illustrated in FIGURE 2.

An extensible alignment means 46' preferably is provided within the chamber 42 for maintaining the plug 22' in axially aligned relation with respect to the horn 12. The extensible alignment means 46' comprises a guide shaft 48' having an end 52 threadedly engaged in the back plate 20 in axially aligned relation with the plug 22' and a guided shaft 50' having one end secured in a hub 51' at the apex of the plug 22' in axially aligned relation therewith. In this embodiment the guide shaft 48' comprises a rod while the guided shaft 50' comprises a tubular member which is telescopingly engaged on the guide shaft 48'.

A plurality of radial arms 54 extends from the guided shaft 50'. The radial arms 54 have terminal ends 56 which are in supporting engagement with the base end 36' of the plug 22'. The radial arms 54 support the plug 22' which as hereinabove stated preferably comprises a thin resilient material.

The operation of the alternative embodiment of FIGURES 2 and 3 is similar in all respects to the operation of the preferred embodiment. The pressurized fluid is introduced and withdrawn from the conduit 44 whereby the plug 22' moves toward or away from the horn 12 (not shown) to control the flow of gas therefrom.

An alternative embodiment of the present plug is illustrated in FIGURE 4 and is designated by the numeral 58. The plug 58 comprises a solid conical plug of lightweight plastic material such as rubber, foamed rubber, foamed polyurethane, and the like. The plug 58 includes an inner end 60 secured to one end of the bellows 24 by means of a suitable adhesive substance. An extensible alignment means 62 comprises a guide shaft 48' and an axially aligned well 64 in the plug 58. The guide shaft 48' is telescopingly engaged in the axially aligned well 64.

A further alternative embodiment of the present valve assembly is illustrated in FIGURE 5. Corresponding numerals are employed to identify corresponding parts already described.

As in the valve assembly illustrated in FIGURE 2, the chamber 42 is defined by the plug 22', the bellows 24 and the back plate 20. In this instance the extensible alignment means comprises a lazy tongs assembly 66.

The lazy tongs assembly 66 is a well known contracting and expanding mechanism which comprises first and second pairs of arms 68, 69. As illustrated the arms of each pair of arms 68, 69 are pivotally secured together at their midpoints 70 and the arms of adjacent ones of the pairs of arms 68, 69 are pivotally connected at their ends 71.

The first pair of arms 68 is secured to the back plate 20 by having one arm end 68a slideably retained in a first cam slot 72 cut in a tab 73 which is secured to the back plate 20 and by having the other arm end 68b pivotally secured to a tab 74 which is secured to the back plate 20.

The second pair of arms 69 are secured to the plug 22'. A support plate 76 is maintained in supporting relation with the plug 22' and includes a second cam slot 78 therein. One arm end 69a is pivotally secured to the support plate 76 while the other arm end 69b is slideably retained in the second cam slot 78.

It should be evident that the lazy tongs assembly 66 will, as herein arranged, maintain the plug 22' substantially aligned with the central axis (not shown) of the flared horn 12.

It should be apparent from the foregoing detailed description that the present invention provides a valve for controlling the flow of gases which are discharged from a conduit into an enlarged discharge zone. The present valve can be conveniently operated from a remote control point and that it is easily assembled, installed and dismantled. The present valve requires no delicate alignment adjustments and is relatively inexpensive to manufacture and maintain. Further the present valve is a unitary structure that is interchangeable with other units of the present valve assembly.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:
1. A gas flow regulating valve for controlling the flow of gas from a conduit terminal, comprising:
   a back plate secured in spaced outer relation to the end of said conduit terminal;
   a normally collapsed, resilient bellows having one end secured to the said back plate;
   a plug having a base end and an apex end and having a diminishing cross-sectional area from the said base end to the said apex end, said plug being positioned between the said bellows and the said conduit terminal and having its said base end secured to the other end of the said bellows whereby the said back plate, the said bellows and the said plug define a chamber, said plug being movable axially toward and away from the said conduit terminal solely by the extension and contraction of the said bellows;
   extensible alignment means within the said chamber for maintaining the said plug substantially axially aligned with the central axis of said conduit terminal; and
   conduit means for introducing and withdrawing fluids from the said chamber whereby the said plug moves axially toward and away from the said conduit terminal to control the flow of gas therefrom.

2. A gas flow regulating valve for controlling the flow of gas from a conduit terminal, comprising:
   a back plate secured in spaced outer relation to the end of said conduit terminal by means of spaced support arms extending from the said back plate to said conduit terminal;
   a normally collapsed, resilient bellows having one end secured to the said back plate;
   a hollow conical plug of relatively rigid material positioned between the said bellows and the end of said conduit terminal and having its base end secured to the other end of said bellows whereby the said back plate, the said bellows and the said plug define a chamber, said plug movable axially toward and away chamber, said plug being movable axially toward and away from the end of said conduit terminal solely by the extension and contraction of the said bellows;
   extensible alignment means connecting the said plug to the said back plate for maintaining the said plug substantially axially aligned with the central axis of the said conduit terminal; and conduit means for introducing and withdrawing fluids from the said chamber whereby the said plug moves axially toward and away from the end of said conduit terminal to control the flow of gas therefrom.

3. A gas flow regulating valve for controlling the flow of gas from a conduit terminal, comprising:

an outwardly flared horn engageable in communicating relation at its narrow end with said conduit terminal;

a back plate secured in spaced outer relation to the enlarged end of said horn by means of spaced support arms extending from the said back plate to the rim of said horn;

a normally collapsed, resilient bellows having one end secured to the said back plate;

a hollow conical plug of thin resilient material positioned between the said bellows and the said horn and having its base end secured to the other end of the said bellows whereby the said back plate, the said bellows and the plug define a chamber, said plug being moveable axially toward and away from the said horn solely by the extension and contraction of the said bellows;

extensible alignment means connecting the said plug to the said back plate for maintaining the said plug substantially axially aligned with the central axis of the said horn; and conduit means for introducing and withdrawing fluids from the said chamber whereby the said plug moves axially toward and away from the said horn to control the flow of gas therefrom.

4. The gas flow regulating valve of claim 1 wherein the said extensible alignment means is disposed within the said chamber and comprises:

a guide shaft and a guided shaft, said guide shaft being telescopingly engaged with the said guided shaft, said guide shaft and said guided shaft being axially aligned with said plug, one said shaft being secured to the said plug and the other said shaft being secured to the said back plate.

5. The flow regulating valve of claim 3 wherein the said extensible alignment means comprises:

a guide shaft having one end secured to the said back plate, a guided shaft telescopingly engaged with the said guide shaft and having one end secured to the apex of said hollow conical plug, and radial arms extending from the said guided shaft, the terminal ends of said radial arms being in supporting engagement with the said base of said hollow conical plug, said guide shaft and the said guided shaft being in axially aligned relation with respect to the said hollow conical plug.

6. The flow regulating valve of claim 5 wherein the said extensible alignment means comprises:

a guide shaft secured at one end to the said back plate in axially aligned relation with said solid conical plug, and an axially aligned well in said solid conical plug, said guide shaft being telescopingly engaged in said well.

7. The flow regulating valve of claim 1 wherein the said extensible alignment means comprises a lazy tongs assembly secured at one end to said backplate and secured at the other end to said plug.

8. A gas flow regulating valve for controlling the flow of gas from a conduit terminal, comprising:

a back plate secured in spaced outer relation to the end of said conduit terminal by means of spaced support arms extending from said back plate to said conduit terminal;

a normally collapsed, resilient bellows having one end secured to said back plate;

a hollow conical plug of thin resilient material positioned between said bellows and the said conduit terminal and having its base end secured to the other end of said bellows whereby said back plate, said bellows and said plug define a chamber, said plug being movable axially toward and away from said conduit terminal solely by the extension and contraction of said bellows;

extensible alignment means connecting said plug to said back plate for maintaining said plug substantially axially aligned with the central axis of said conduit terminal; and conduit means for introducing and withdrawing fluids from said chamber whereby said plug moves axially toward and away from said conduit terminal to control the flow of gas therefrom.

9. A gas flow regulating valve for controlling the flow of gas from a conduit terminal, comprising:

a back plate secured in spaced outer relation to the end of said conduit terminal by means of spaced support arms extending from said back plate to the rim of said conduit terminal;

a normally collapsed, resilient bellows having one end secured to the said back plate;

a solid conical plug positioned between the said bellows and the said conduit terminal and having its base end secured to the other end of said bellows whereby the said back plate, the said bellows and the said plug define a chamber, said plug being moveable axially toward and away from the end of said conduit terminal solely by the extension and contraction of the said bellows;

extensible alignment means connecting the said plug to the said back plate for maintaining the said plug substantially axially aligned with the central axis of the said conduit terminal; and conduit means for introducing and withdrawing fluids from the said chamber whereby the said plug moves axially toward and away from the end of said conduit terminal to control the flow of gas therefrom.

References Cited

UNITED STATES PATENTS

| | | | |
|---|---|---|---|
| 1,319,154 | 10/1919 | Johnson | 137—220 |
| 2,584,523 | 2/1952 | Work | 251—25 X |
| 3,010,692 | 11/1961 | Jentoft | 251—61 |
| 1,779,503 | 10/1930 | Swindin | 251—331 X |
| 2,672,293 | 3/1954 | Ludlow | 251—331 X |
| 2,725,578 | 12/1955 | Keller | 137—796 X |

FOREIGN PATENTS

| | | |
|---|---|---|
| 800,228 | 10/1950 | Germany. |
| 23,083 | 7/1901 | Switzerland. |

WILLIAM F. O'DEA, *Primary Examiner.*

DENNIS H. LAMBERT, *Assistant Examiner.*

U.S. Cl. X.R.

137—219; 251—147